United States Patent
Aman et al.

(10) Patent No.: US 7,844,709 B2
(45) Date of Patent: Nov. 30, 2010

(54) METHOD AND APPARATUS FOR MANAGING CENTRAL PROCESSING UNIT RESOURCES OF A LOGICALLY PARTITIONED COMPUTING ENVIRONMENT WITHOUT SHARED MEMORY ACCESS

(75) Inventors: Jeffrey D. Aman, Poughkeepsie, NY (US); Yuk L. Chan, Poughkeepsie, NY (US); Yuksel Gunal, New York, NY (US); Hiren R. Shah, Highland, NY (US); Mathew S. Thoennes, West Harrison, NY (US); Peter B. Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/533,558

(22) Filed: Sep. 20, 2006

(65) Prior Publication Data
US 2008/0215846 A1  Sep. 4, 2008

(51) Int. Cl.
G06F 15/173 (2006.01)
(52) U.S. Cl. ............................ 709/226; 709/229; 714/39
(58) Field of Classification Search .................. 709/226
See application file for complete search history.

(56) References Cited

U.S. PATENT DOCUMENTS

| | | | | |
|---|---|---|---|---|
| 5,603,029 | A | 2/1997 | Aman et al. | 395/675 |
| 5,819,063 | A | 10/1998 | Dahl et al. | 395/500 |
| 6,587,938 | B1 | 7/2003 | Eilert et al. | 712/29 |
| 6,622,177 | B1 | 9/2003 | Eilert et al. | 710/3 |
| 2002/0049687 | A1* | 4/2002 | Helsper et al. | 706/45 |
| 2003/0037092 | A1 | 2/2003 | McCarthy et al. | 709/104 |
| 2003/0084030 | A1* | 5/2003 | Day et al. | 707/3 |
| 2005/0091454 | A1* | 4/2005 | Shimada et al. | 711/114 |
| 2005/0108362 | A1* | 5/2005 | Weinert et al. | 709/217 |
| 2005/0149677 | A1* | 7/2005 | Shimada et al. | 711/114 |
| 2005/0177684 | A1* | 8/2005 | Hoshino et al. | 711/114 |

(Continued)

OTHER PUBLICATIONS

Chavez A. et al Association for Computing Machinery, Challenger: A Multi-Agent System for Distributed Resource Allocation, Proceedings of the First International Conference on Autonomous Agents Marina Del Rey, CA, vol. Conf 1 Feb. 5, 1997, pp. 323-332, New York, ACM, US.*

Primary Examiner—Firmin Backer
Assistant Examiner—Hamza Algibhah
(74) Attorney, Agent, or Firm—Cantor Colburn LLP; William Kinnaman

(57) ABSTRACT

A method and apparatus for managing CPU resources of a logically partitioned computing environment without shared memory access. A logical partition needing additional resources sends a message requesting such resources to a central domain manager, which sends messages to other partitions in the same group requesting that they assess their ability to donate resources to the requesting partition. Upon receiving such assessment request, each logical partition assesses its ability to donate resources to the requesting partition and responds accordingly to the domain manager. If at least one partition responds that it can donate resources to the requesting partition, the domain manager sends a message to a selected donor partition requesting that it reconfigure itself to donate resources to the requesting partition. Upon receiving a notification from the donor partition that it has successfully reconfigured itself, the domain manager notifies the requesting partition, which reconfigures itself to accept the donated resources.

16 Claims, 9 Drawing Sheets

U.S. PATENT DOCUMENTS

| | | | |
|---|---|---|---|
| 2005/0182788 A1* | 8/2005 | Arndt et al. | 707/103 R |
| 2006/0034167 A1* | 2/2006 | Grice et al. | 370/229 |
| 2006/0259733 A1* | 11/2006 | Yamazaki et al. | 711/173 |
| 2007/0022425 A1* | 1/2007 | Jackson | 718/104 |
| 2007/0067065 A1* | 3/2007 | El-Gasseir et al. | 700/286 |
| 2007/0083662 A1* | 4/2007 | Adams et al. | 709/229 |
| 2007/0124274 A1* | 5/2007 | Barsness et al. | 707/2 |
| 2007/0169127 A1* | 7/2007 | Kashyap | 718/104 |

* cited by examiner

METHOD AND APPARATUS FOR MANAGING CENTRAL PROCESSING UNIT RESOURCES OF A LOGICALLY PARTITIONED COMPUTING ENVIRONMENT WITHOUT SHARED MEMORY ACCESS

CROSS-REFERENCE TO RELATED APPLICATION

This application is related to the commonly owned, concurrently filed application of applicant Mathew S. Thoennes et al., entitled "METHOD AND APPARATUS FOR ESTIMATING A LOCAL PERFORMANCE INDEX TO MEASURE THE PERFORMANCE CONTRIBUTION OF A SINGLE SERVER IN A MULTI-TIERED ENVIRONMENT", Ser. No. 11/533,574, incorporated herein by reference.

BACKGROUND OF THE INVENTION

1. Field of the Invention

This invention relates in general to managing workload within a computing system and in particular to managing workload in a logically partitioned system.

2. Description of the Related Art

Logically partitioned systems in which single physical machines are partitioned into multiple logical machines are well known in the art. Logical partitioning allows the establishment of a plurality of system images within a single physical machine or central processor complex (CPC). Each system image is capable of operating as if it were a separate computer system. That is, each logical partition can be independently reset, initially loaded with an operating system that may be different for each logical partition, and operate with different software programs using different input/output (I/O) devices.

Examples of logically partitioned computing systems are described in, for instance, U.S. Pat. No. 4,564,903 (Guyette et al.), entitled "Partitioned Multiprocessor Programming System"; U.S. Pat. No. 4,843,541 (Bean et al.), entitled "Logical Resource Partitioning of a Data Processing System"; and U.S. Pat. No. 5,564,040 (Kubala), entitled "Method and Apparatus for Providing a Server Function in a Logically Partitioned Hardware Machine", each of which is incorporated herein by reference. Commercial embodiments of logically partitioned systems include, for example, IBM zSeries and System z9 (collectively, System z) systems and IBM POWER5-based systems. (POWER5, System z and System z9 are trademarks, and zSeries is a registered trademark, of IBM Corporation.)

One important aspect of a logically partitioned system is the management of workload running within the partitions of that system. In the industry there are a number of examples of workload managers which are used to manage the workload within and among the partitions. One such workload manager is the workload manager in the z/OS operating system. (z/OS is a registered trademark of IBM Corporation.) In general these workload managers attempt to balance the workload of the partitions by moving work to the physical resources of the system. In order to move the work, however, it is important to ensure that the data needed by the relocated work is at the moved location. This need often restricts the movement of work.

The z/OS workload manager improved on this capability by providing the capability of moving central processor unit (CPU) capacity between logical partitions. This capability is described in U.S. Pat. No. 6,587,938, incorporated herein by reference. This z/OS workload manager, however, uses a peer-to-peer management approach where the workload management function on each partition has full knowledge of the workload running on each of the other partitions being managed. This requires a large amount of data to be shared between the partitions. To do this data sharing in an efficient manner, the z/OS workload manager depends on each partition being managed having access to a mechanism to share memory across the partitions. Such memory-sharing capability is not available in all logically partitioned environments, limiting the applicability of the z/OS approach.

SUMMARY OF THE INVENTION

The present invention provides the functions for managing CPU resources across partitions of a logically partitioned computer system that are described in U.S. Pat. No. 6,587,938. Both approaches manage CPU resources to achieve the performance goals of the different workloads running on these partitions. However the present invention does not require sharing a large amount of data between the partitions and therefore does not have the same requirement for a shared memory capability between the partitions.

More particularly, the present invention contemplates a method, apparatus and computer program product for reallocating resources among the partitions in an information handling system in which resources of one or more physical machines are allocated among a group of logical partitions. In accordance with the invention, an assessment collector is responsive to receiving a resource request message from a requesting partition to send an assessment request message to another partition in the group requesting that the other partition assess whether it has resources available for the requesting partition. An assessment analyzer is responsive to receiving an assessment response message from the other partition indicating whether it has resources available for the requesting partition to send a message to the requesting partition informing it whether resources are available from another partition.

Preferably, the assessment collector sends assessment request messages to, and the assessment analyzer receives assessment response messages from, multiple other partitions in the group. In such case, the assessment analyzer is responsive to receiving multiple favorable assessment response messages to select a donor partition from among the responding partitions.

In response to receiving a favorable assessment response message from the other partition (and after selecting a donor partition, if there are multiple favorably responding partitions), the assessment analyzer sends a reconfiguration request message to the donor partition requesting that it reconfigure itself to make resources available to the requesting partition. If the assessment analyzer does not receive a favorable reconfiguration response message from the other partition, indicating that the other partition has successfully reconfigured itself to make resources available to the requesting partition, it sends a message to the requesting partition informing it that no resources are available from another partition.

If the assessment analyzer does receive a favorable reconfiguration response message from the other partition, it sends a message to the requesting partition requesting that it reconfigure itself to receive the resources made available by the other partition.

If the assessment analyzer does not receive a favorable assessment response message, indicating that another partition has resources available for the requesting partition, it sends a message to the requesting partition informing it that no resources are available from another partition.

Preferably, the requesting partition and the other partition each have a performance index associated therewith, and the resource request message and the assessment response message from these partitions each specify a current performance index of the respective partition and a projected performance index of the respective partition with the additional resources reallocated. In such case, the assessment analyzer determines the net changes in the performance indexes of the requesting partition and the donor partition resulting from reallocation of the additional resources from the donor partition to the requesting partition. Only if the net change in the performance index of the requesting partition is greater than the net change in the performance index of the donor partition does the assessment analyzer effect a resource reallocation from the donor partition to the requesting partition.

As in the implementation described in U.S. Pat. No. 6,587,938, the present invention organizes the workloads running on the partitions being managed into service classes with each service class having a performance goal associated with it. The present invention also performs the basic tasks of the implementation described in U.S. Pat. No. 6,587,938 in order to implement management of CPU resources across partitions based on workload goals. These tasks are:
1. Determine that a service class is missing its goal due to a lack of CPU resource on one of the partitions being managed.
2. Project how much this service class can be helped by increasing the CPU resource allocation to this partition.
3. Find other partitions that are physically able to donate CPU resource to the partition needing help.
4. Project the impact to the performance of the service classes running on these donor partitions that would be caused by removing CPU resource from donor partitions.
5. Based on the performance projections for the donors and receiver, determine if moving the CPU resources from one of the donor partitions to the partition needing help results in the workload goals being more closely achieved overall.

In the implementation described in U.S. Pat. No. 6,587,938, all the tasks described above are performed by the workload management function on the partition with the service class needing help. It is the requirement to make performance projections about workloads running on different partitions that causes this prior implementation to require large amounts of performance data to be shared amount the partitions. To greatly reduce the amount of data that must be shared among the partitions, the present invention distributes these steps between the workload management function on each partition being managed and a central management server function called the domain manager. In the present invention, projections for capacity changes for work running on a given partition are done by that partition's local workload manager function. Therefore the low-level performance data is only needed on the local partition. The domain manager is used to understand the topology of the partitions across which CPU resources can be balanced and to determine the optimal resource reallocations based on projections done on the local partitions.

The present invention is preferably implemented in software running on conventional computer hardware using conventional interconnection hardware. However, in general the present invention may be implemented in hardware (including microcode), software running on such conventional hardware, or some combination of the two. When implemented in software or microcode, the implementation may take the form of a computer program product including a computer-readable program of instructions stored on a computer-usable medium for implementing the method of the invention. In such software or microcode implementation, the software portions of the various elements recited in the appended apparatus claims (including means elements, if any) correspond to the program instructions on such computer-usable medium for performing the steps in question.

BRIEF DESCRIPTION OF THE SEVERAL VIEWS OF THE DRAWING(S

DETAILED DESCRIPTION OF THE INVENTION

The present invention builds on the concepts of goal-oriented resource management by a workload manager that are described in U.S. Pat. No. 5,473,773 (Aman et al.), entitled "Apparatus and Method for Managing a Data Processing System Workload According to Two or More Distinct Processing Goals"; and U.S. Pat. No. 5,675,739 (Eilert et al.), entitled "Apparatus and Method for Managing a Distributed Data Processing System Workload According to a Plurality of Distinct Processing Goal Types", each of which is incorporated herein by reference. These patents describe the concepts of organizing the workloads of a computer system into service classes. Associated with each service class is a performance goal. Also associated with each service class is an importance level which indicates how important it is to achieve that service class's goals compared to the service class goals of other workloads.

Figure 1:
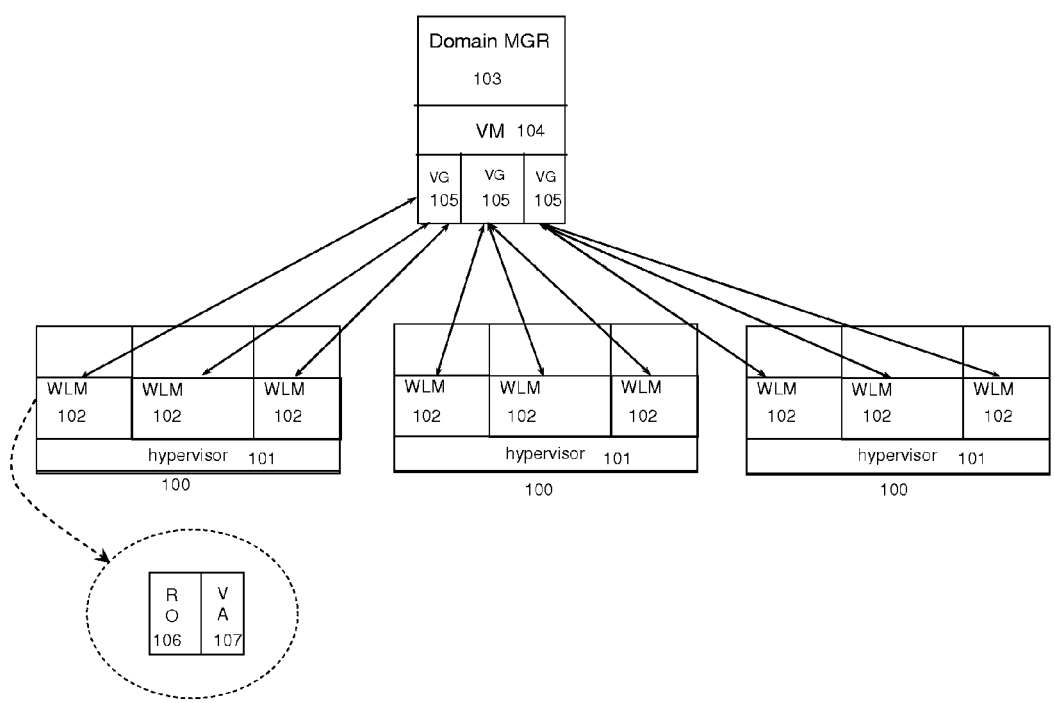
FIG. 1 shows a data processing system incorporating the present invention.

FIG. 1 shows a data processing system incorporating the present invention, in which one or more partitioned computer systems 100 are managed. Although the present invention is not limited to any particular architecture, examples of such computer systems 100 are computer systems based on the IBM POWER5 architecture. In a manner well known in the art, each computer system 100 contains one or more central processing units (CPUs) (not separately shown) instantiating the POWER5 or other instruction set architecture. Each computer system also contains a logical partition manager or hypervisor 101, whose role it is to control logical partitions of the computer system 100, an exemplary three of which are shown. Changes to the share of the physical CPU resources assigned to a logical partition are made through the hypervisor 101.

Running on each of the partitions being managed are an operating system (OS) and, typically, one or more applications. Since these are conventional elements, they have not been separately shown. Although the invention is not limited to any particular operating system, in the embodiment shown it will be assumed that the operating system is the IBM AIX operating system. (AIX is a registered trademark of IBM Corporation.) Also running on each of the partitions being managed is a workload management (WLM) component 102. It is the role of the WLM component 102 to collect data about the performance of the workloads running on its partition and to change the amount of CPU resources assigned to the partitions through application program interfaces (APIs) provided by the hypervisor 101.

The logical partitions on a computer system 100 can be organized into groups. Groups limit the scope of CPU resource management so that CPU resources may only be moved between partitions in the same group. Logical partition groups are described in U.S. Pat. No. 7,007,276 (Kubala et al.), entitled "Method, System and Program Products for Managing Groups of Partitions of a Computing Environment", incorporated herein by reference.

A domain manager 103 is the global control point across all the computer systems 100 being managed. The role of the domain manager 103 is to understand the topology of the partitions across which resources can be balanced and to determine the optimal CPU resource allocations for the partitions being managed. The domain manager 103 is a separate application that can run on any computer system (including one of the computer systems 100) that has network access to the computer systems 100 being managed.

The domain manager 103 has several subcomponents. A virtualization manager (VM) 104 serves as a top-level manager of logical partition CPU resources. VM 104 understands the relationships of logical partition groups to the computer system 100 on which the partitions of the group run. It also understands the relationship between each WLM component 102 and the logical partition on which it runs. The VM subcomponent 104 delegates management of a specific logical partition group to a virtual group (VG) subcomponent 105, described below. VM 104 receives all messages related to virtual server management and directs them to the appropriate VG subcomponent 105.

The VG subcomponent 105 represents a logical partition group to the domain manager 103. It provides the logical partition management functions for a specific logical partition group. The VG subcomponent 105 understands the set of logical partitions that are part of its logical partition group. It has the role of arbitrating CPU resource allocation requests between the partitions in such logical partition group.

The WLM component 102 running on each logical partition also has two subcomponents to support logical partition CPU resource management. A virtual agent (VA) 107 subcomponent has the role of interfacing with the hypervisor 101 for its logical partition. The VA component 107 collects data about the CPU resource used by its partition through APIs provided by the hypervisor 101. One example of such APIs is the lpar_get_info API provided by the IBM AIX operating system. This API is described in the IBM publication *AIX 5L Version 5.3 Technical Reference: Base Operating System and Extensions, Volume* 1, SC23-4913-03, Fourth Edition (July 2006), available online and incorporated herein by reference. The VA component is also responsible for calling a hypervisor API to change the amount of CPU resources assigned to its partition. An example of such an API is the lpar_set_resource API provided by the IBM AIX operating system, which is described in the same IBM AIX publication.

A resource optimizer (RO) 106 is responsible for understanding the performance of the service classes running on its logical partition. It is also responsible for projecting the performance impact on these service classes of either adding CPU resources to its partition or removing CPU resources from its partition.

Figure 2:
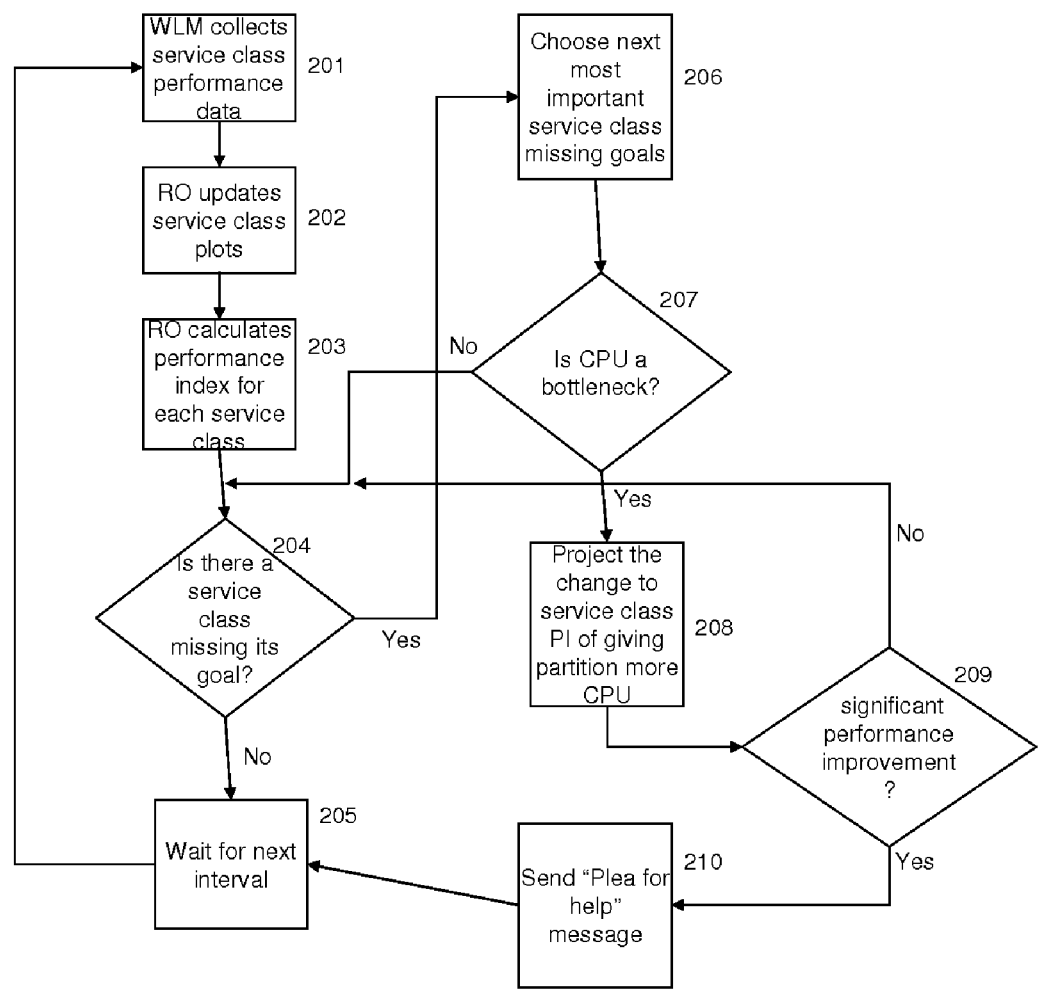
FIG. 2 shows the processing within the workload manager (WLM) component on each partition being managed.

FIG. 2 shows the processing within the WLM component 102 on each partition being managed. This processing is done on an interval basis, for example every 10 seconds. At step 201 the WLM component 102 collects performance data for each service class running on the partition. Additionally, "CPU using" and "CPU delay" samples are collected for each service class. These steps of collecting performance data and CPU using and CPU delay samples are described in the above-identified U.S. Pat. No. 5,473,773. An additional step in this data collection process is for the VA component 107 to call a hypervisor API to collect information on the total CPU resource used by the partition. An example of such a hypervisor API is the above-identified lpar_get_info API provided by the IBM AIX operating system.

Figure 9:
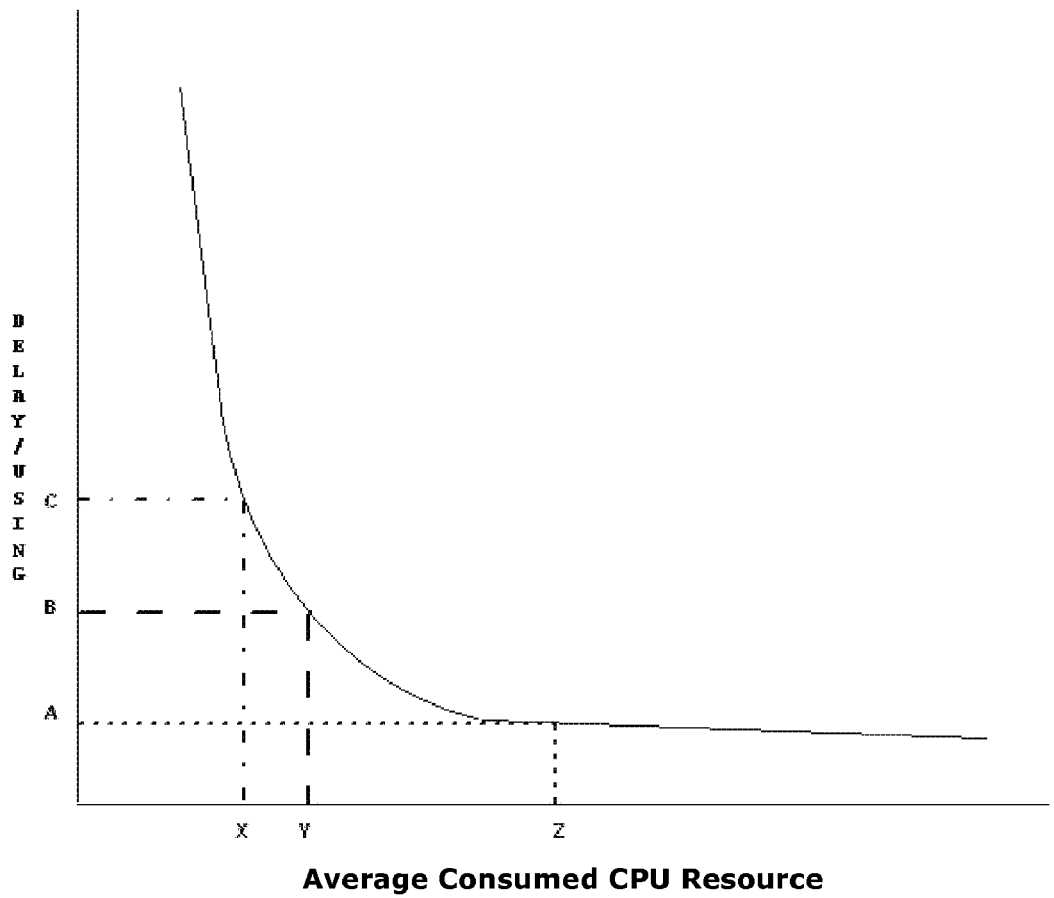
FIG. 9 shows a graph used to project the performance impact of changes in the CPU resource allocated to a partition.

At step 202 the performance data collected at step 201 is used to update a graph for each service class that plots the relationship between CPU resource consumed by the partition and performance of the service class. This graph is shown in FIG. 9 and is described below.

At step 203 the RO component 106 calculates the performance index (PI) for each service class, as described in the above-identified U.S. Pat. No. 5,473,773. (In a multi-tier system with multiple servers in each tier, this method may be modified as described in the related application identified above.)

At step 204 the RO component 106 determines if any service class is missing its performance goal. If no service class is missing its goal, at step 205 the processing waits until it is time for the next interval and the processing repeats.

If there is at least one service class missing goals, processing proceeds to step 206 where the most important service class missing its goal is chosen. If more than one service class at the same importance level is missing its goal, the service class with the highest performance index is chosen. The chosen service class is called the receiver service class. At step 207 the receiver service class is checked to see if has collected CPU delay samples. If the receiver service class has not collected CPU delay samples, its performance cannot be helped by increasing the CPU resources given to the partition. In this case, processing returns to steps 204 and 206, where another service class missing its goals is chosen. Once all service classes that are missing their goal have been chosen, processing goes to step 205 to wait for the next interval.

At step 208 a projection is made to see how much the performance of the receiver service class would be improved by increasing the CPU resource given to the partition. Step 209 tests whether the performance improvement is sufficient to justify a CPU resource reallocation. In the preferred embodiment, this test is that the improvement in the performance index projected for the receiver service class is the larger of: (1) 10% of the difference between the current performance index of the receiver service class and 1.0; and (2) 0.05.

If this test for sufficient value is not passed, processing returns to step 204 to look for another potential receiver service class.

If there is sufficient value, at step 210 a "plea for help" message is sent to the domain manager 103. The message contains the amount of CPU resource requested, the name of the receiver service class, the receiver service class's current performance index, and the receiver service class's projected performance index.

Associated with each service class is a graph used to project the performance impact of changes in the CPU resource given to the partition. The result of this projection is a projected change in performance index. The use of graphs for performance projections is described in the above-identified U.S. Pat. 5,473,773.

FIG. 9 shows an example of the graph used. The y axis of the graph is the ratio of CPU delay samples to CPU using samples over an interval of time; for example, one minute is used in this embodiment. This ratio is called the delay-to-using ratio. The x axis of the graph is the amount of CPU resource used by the partition over the same interval. At step 202 above the most recent data is added to the graph.

The first step to projecting the performance impact is to read from the graph the delay-to-using ratio corresponding to the CPU resource used by the partition over that last one minute. The next step is to read the projected delay-to-using ratio that corresponds to the CPU resource after additional CPU resource is given to the partition. An assumption is made that the resource change will primarily impact CPU-delay samples and that CPU-using samples will be constant. So from a delay-to-using ratio, CPU delay samples can be calculated as follows:

CPUDelay=DelayToUSINGRatio×CurrentCPU USING

The projected change in CPU delay samples is calculated as:

ΔCPUDelay=CurrentCPU Delay−ProjectedCPU Delay

The total samples seen for a service class is approximately proportional to the average response time of the service class. This provides the relationship:

$$\frac{\Delta CPUDelay}{TotalSamples} = \frac{\Delta ResponseTime}{CurrentResponseTime}$$

Thus:

$$\Delta ResponseTime = \frac{CurrentResponseTime * \Delta CPUDelay}{TotalSamples}$$

The projected change in PI is calculated as follows:

$$ProjectedPI = \frac{PI * Goal + \Delta LocalResponseTime}{Goal}$$

where Goal is the response time goal for the service class.

Figure 3:
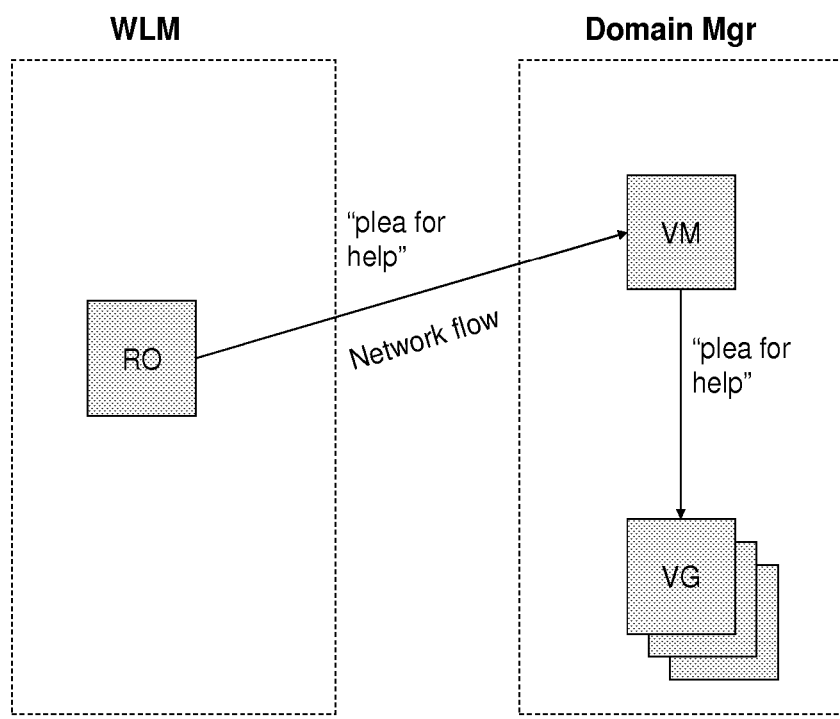
FIG. 3 shows the data flow of the "plea for help" message between the WLM component on a partition being managed and the domain manager.

FIG. 3 shows the data flow of the "plea for help" message between the WLM component 102 on a partition being managed and the domain manager 103. The message can flow over any available network protocol, for example TCP/IP. As shown in the figure, the message is initially received by the VM component 104 of the domain manager 103 and then delegated to the VG component 105 that manages the partition that sent the message.

Figure 4:
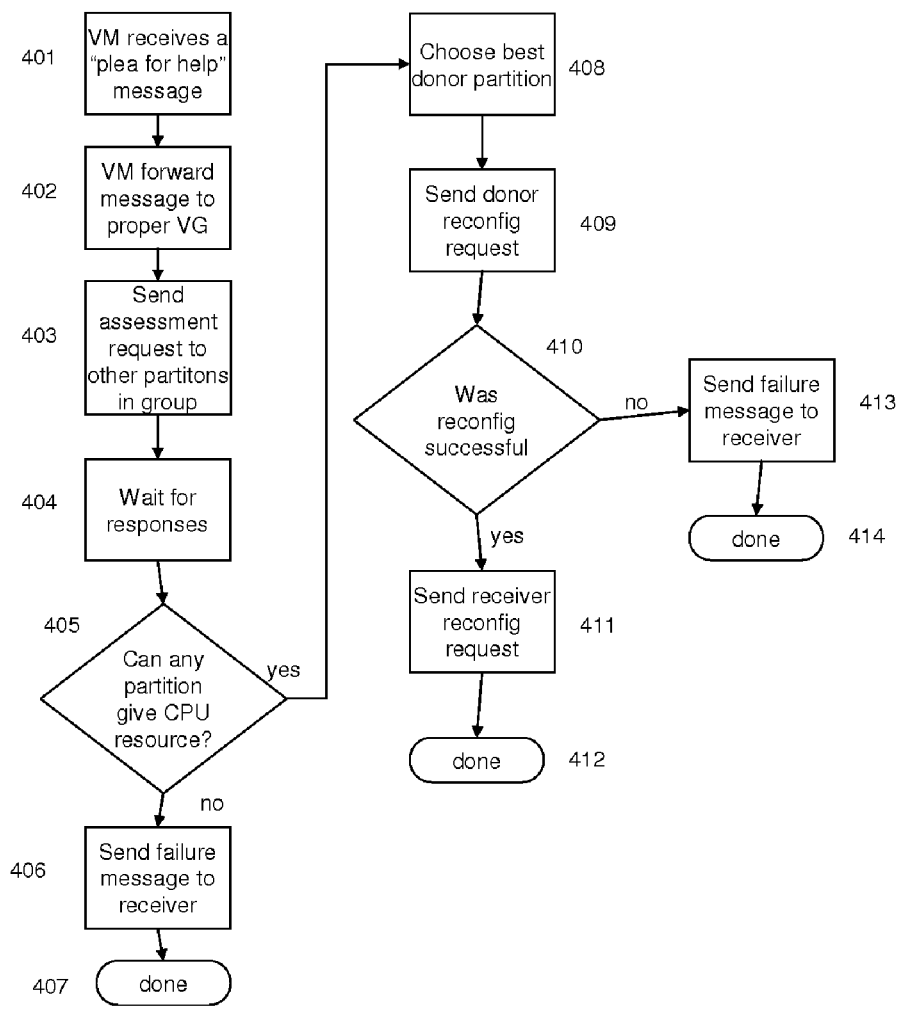
FIG. 4 shows the processing when the domain manager receives a "plea for help".

FIG. 4 shows the processing when the domain manager receives a "plea for help". This processing can be conveniently divided into an assessment collector function (steps 401-403), in which assessments are collected from other partitions, and an assessment analyzer function (steps 404-412) in which these assessments are analyzed.

Figure 5:
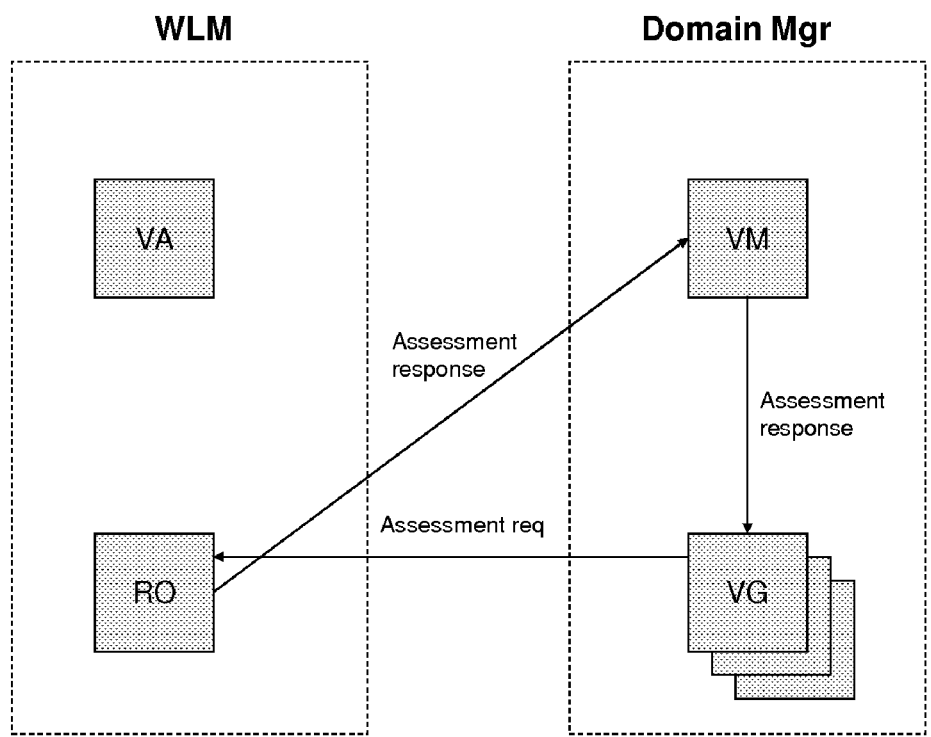
FIG. 5 shows the message flows for the "assessment request" message and the response from each WLM component.

At step 401 the domain manager 103 receives a "plea for help message", and at step 402 it delegates the message to the proper VG component 105. The partition that sent the "plea for help message" is known as the receiver partition. At step 403, the VG component 105 sends an "assessment request" message to every partition in the partition group except the receiver partition. This message asks the WLM component 102 on each of these partitions to project the impact of giving up CPU resource on the workloads running on that partition. The message contains the amount of CPU resource required by the receiver partition. FIG. 5 shows the message flows for the "assessment request" message and the response from each WLM component 102.

Figure 6:
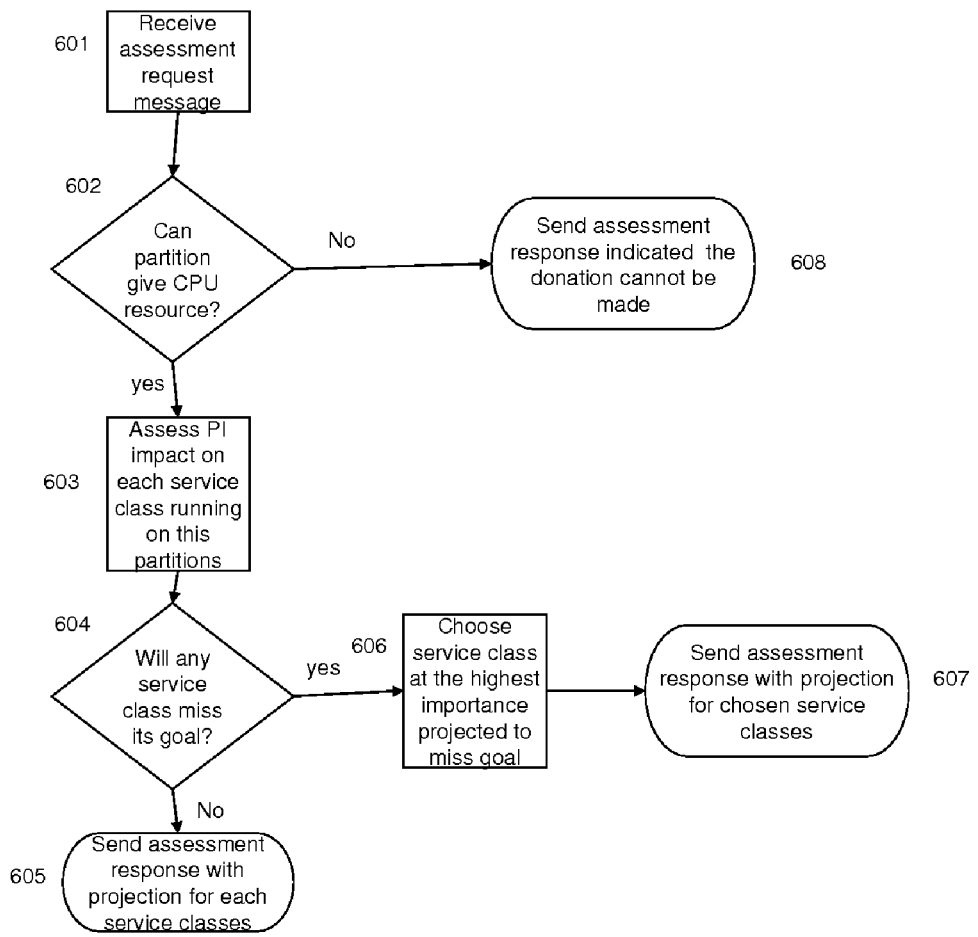
FIG. 6 shows the processing within the WLM component of the partition that receives an assessment request message.

FIG. 6 shows the processing within the WLM component 102 of the partition that receives an assessment request message.

At step 601 the message is received. At step 602 at test is made to see if the local partition is allowed to give up the amount of CPU resource requested in the message. Part of the definition of the partition may include a minimum allowed amount of CPU resource for the partition. If the act of giving up the amount of CPU resource contained in the "assessment request" message would take the local partition below such a minimum, the partition is not allowed to give up the requested resource. In this case at step 608, an "assessment response" message is sent indicating the partition cannot donate the requested CPU resource.

If the partition can potentially give up the requested CPU resource, processing continues to step 603, where a projection is made of the performance impact on each service class that would be caused by the local partition giving up the requested CPU resource. This performance projection takes the form of a projected performance index for each service class, as described above. At step 604 a test is made to determine if any service class is projected to miss its goal. If there are service classes projected to miss their goals, at step 606 the set of service classes at the highest importance level that are missing their goals are chosen. At step 607 an "assessment response" message is built containing this list of selected service classes, their current performance index and their projected performance index. This message is sent to the domain manager 103.

If no service class is projected to miss its goal, at step 605 an "assessment response" message is built containing all the service classes, their current performance index and their projected performance index. This "assessment response" message is sent to the domain manager 103.

Returning to the processing shown in FIG. 4, in the assessment analysis phase, at step 404 the VG subcomponent 105 of the domain manager 103 has sent an "assessment request" to each partition in its group except for the receiver partition; the VG subcomponent 105 then waits for the "assessment replies" from each of the partitions.

Once all the "assessment replies" have been received, at step 405 a test is made to see if any partition can donate the requested CPU resource. To implement this test, a list of potential donor partitions is created. Initially, this list contains all the partitions in the group except for the receiver partitions. Next, any partition whose "assessment reply" message indicates that it is unable to donate the requested CPU resource is removed from the list. If any partitions remain in the list, each of the potential donors is evaluated based on the relative importance and change to the performance index of its service classes as compared with the receiver service class.

For example, if a service class on a potential donor that is more important than the receiver service class is projected to miss goals, the donor partition should not be used. The complete evaluation is described in the following pseudocode:

```
1   receiver_change_in_pi = receiver_projected_pi –
    receiver_current_pi
2   do for each service class in donor response
3   donor_change_in_pi = donor_projected_pi – donor_current_pi
4   if donor service class projected to missing goals
5   if donor service class more important than receiver service class
6   Indicate donor partition cannot be used
7   Exit
8   end if
9   if receiver service class meeting goals
10  Indicate donor partition cannot be used
11  Exit
12  end if
13  if donor service class importance equal to receiver service class
    importance
14  if donor_change_in_pi > receiver_change_in_pi
15  Indicate donor partition cannot be used
16  Exit
17  end if
18  If (donor_projected_pi – receiver_projected_pi) >
    (donor_current_pi – receiver_current_pi)
19  /* The above test to see if the donor and receiver PIs are further
    apart after the change*/
20  Indicate donor partition cannot be used
21  Exit
22  end if
23  end if
23  Else /* donor service class projected to meet goals */
25  if receiver service class projected to meet goals
26  If donor_change_in_pi > receiver_change_in_pi
27  Indicate donor partition cannot be used
28  Exit
29  end if
30  end if
31  end do for each donor service class
32  Indicate donor partition can be used
33  Exit
```

Each partition that this evaluation indicates cannot be used as a donor is removed from the potential donor list. If no potential donors remain on the list, at step 406 a message is sent to the receiver partition to inform it that a donation to help the selected receiver service class cannot be made at this point in time. The receiver service class will not be eligible to be selected as a receiver for a period of time, in this implementation 3 minutes. This period of ineligibility avoids selecting the same receiver service class every interval when it cannot be helped.

If the potential donor partition list is not empty at step 405, processing continues to step 408 where the best donor partition is selected. If there is a partition on the potential donor partition list where no service classes are projected to miss goals, it is selected as the best donor. If all partitions on the potential donor list have service classes missing goals, the partition where the service classes missing goals are at the lowest importance level is chosen as the best donor.

Figure 7:
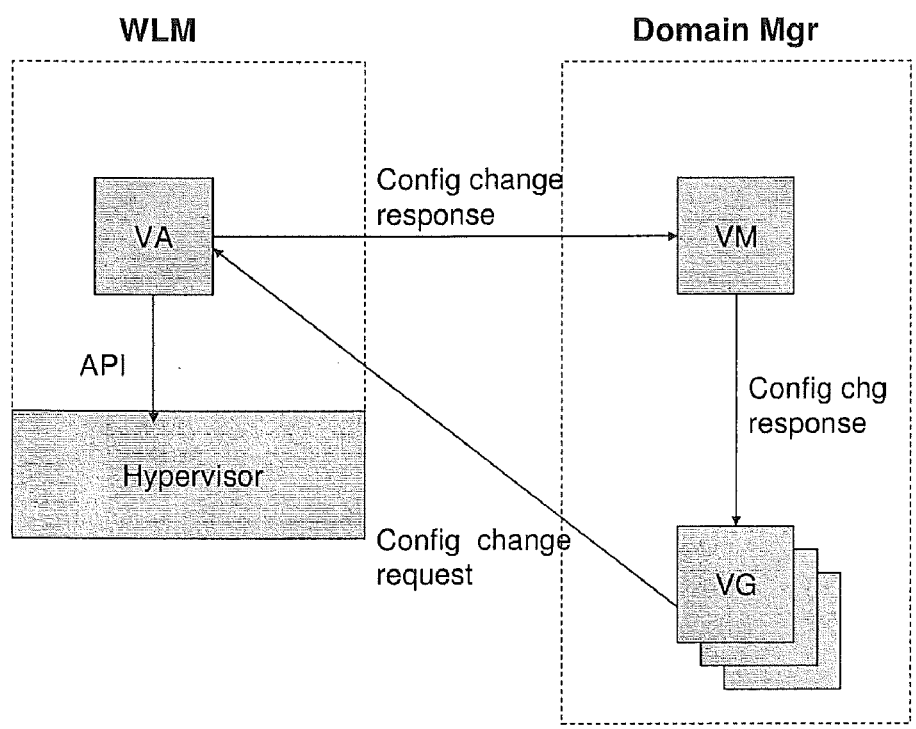
FIG. 7 shows the message flow for the "configuration change request" message.

At step 409 a "configuration change request" message is sent to the donor partition selected at step 408. This message contains the amount of CPU resource the donor partitions should give up. FIG. 7 shows the message flow for the "configuration change request" message. The VG subcomponent 104 of the domain manager 103 sends the message to the WLM component 102 on the donor partition. The message is processed by the VA subcomponent. This processing of this message is shown in FIG. 8.

At step 410 the "configuration change response" message is processed. If the response indicates that the donor partition was able to give up the requested CPU resource, the receiver partition can be notified to take the CPU resources that the donor partition gave up. At step 411 this is done by sending the receiver partition a "configuration change request" message to increase its CPU resource by the amount the donor partitions gave up. Processing of the "configuration change request" message is shown in FIG. 8. Once the receiver partition processes its "configuration change request" message, handling of the original "plea for help" message from the receiver partition has been completed successfully and the requested resource has been moved from the donor partition to the receiver partition.

Figure 8:
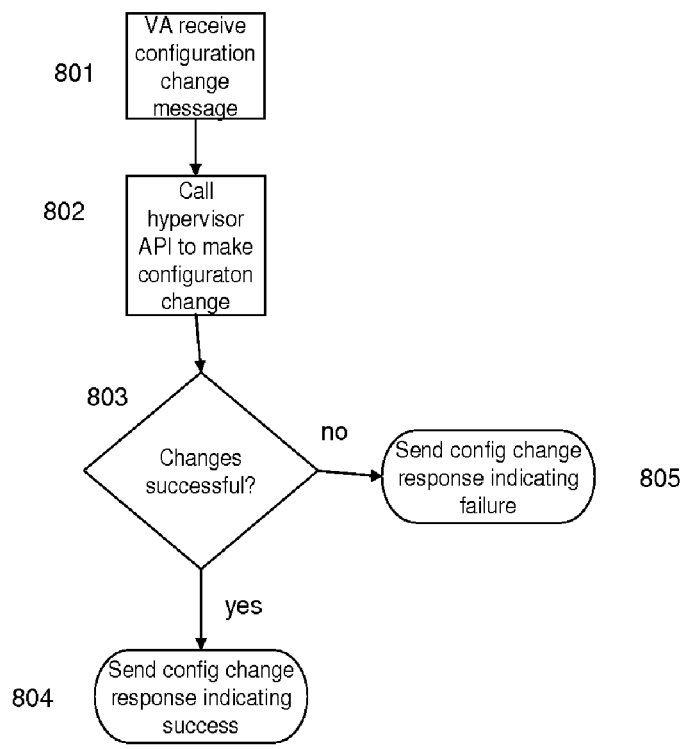
FIG. 8 shows the processing of the "configuration change request" message by the VA subcomponent.

FIG. 8 shows the processing of a "configuration change request" message by a WLM component 102 on a partition being managed. This "configuration change request" message may be either a request to give up CPU resource if the partition is a donor partition or a request to take more CPU resource if the partition is the receiver partition. At step 801 the message is received by the VA component 107. To process the request the VA component 107 calls an API provided by the hypervisor 101 to make the requested change to the CPU resource assigned to the partition. An example of such a hypervisor API is the above-referenced lpar_set_resource API provided by the IBM AIX operating system. This API call will return an indication of whether the attempt to change the CPU resources assigned to the partition was successful or not. If the change was successful, at step 804 a "configuration change response" message is sent to the domain manager 103 indicating the resource allocation change was successful. If the change was not successful, at step 805 a "configuration change response" message is sent to the domain manager 103 indicating that the resource allocation change failed.

While a particular embodiment has been shown and described, various modifications will be apparent to those skilled in the art.

What is claimed is:

1. In an information handling system in which resources of one or more physical machines are allocated among a group of logical partitions, a method for reallocating the resources among the partitions, comprising the steps of:

receiving a resource request message from a requesting partition in the group of logical partitions for additional resources from another partition in the group of logical partitions;

in response to receiving the resource request message, sending an assessment request message to the other partition requesting that the other partition assess whether it has resources available for the requesting partition;

receiving from the other partition an assessment response message indicating whether it has resources available for the requesting partition;

in response to receiving the assessment response message, sending a message to the requesting partition informing it whether resources are available from another partition;

wherein the requesting partition and the other partition each have a performance index associated therewith, the performance index being based on a delay-to-using ratio, and in which the resource request message and the assessment response message from these partitions each specify a current performance index of the respective partition and a projected performance index of the respective partition with the additional resources reallocated, the method comprising the further steps of:

determining net changes in the performance indexes of the requesting partition and the other partition resulting from reallocation of the additional resources from the other partition to the requesting partition; and effecting a resource reallocation from the other partition to the requesting partition only if the net change in the performance index of the requesting partition is greater than the net change in the performance index of the other partition.

2. The method of claim 1 in which assessment request messages are sent to, and assessment response messages received from, a plurality of other partitions in the group of logical partitions.

3. The method of claim 2 in which a plurality of assessment response messages from responding partitions indicate that the responding partition has resources available for the requesting partition, the method further comprising the step of: selecting a donor partition from among the responding partitions.

4. The method of claim 1 in which the assessment response message from the other partition indicates that the other partition has resources available for the requesting partition, the method further comprising the steps of:
    sending a reconfiguration request message to the other partition requesting that it reconfigure itself to make resources available to the requesting partition; and
    receiving a reconfiguration response message from the other partition indicating whether the other partition has successfully reconfigured itself to make resources available to the requesting partition.

5. The method of claim 4 in which the message to the requesting partition informs the requesting partition that no resources are available from another partition if the reconfiguration response message indicates that the other partition has not successfully reconfigured itself to make resources available to the requesting partition.

6. The method of claim 4 in which the message to the requesting partition requests that it reconfigure itself to receive the resources made available by the other partition if the reconfiguration response message indicates that the other partition has successfully reconfigured itself to make resources available to the requesting partition.

7. The method of claim 1 in which the message to the requesting partition informs the requesting partition that no resources are available from another partition if the assessment response message indicates that it has no resources available for the requesting partition.

8. The method of claim 1 in which the messages are sent using network protocols.

9. The method of claim 1 in which the resources are CPU resources.

10. In an information handling system in which resources of one or more physical machines are allocated among a group of logical partitions, apparatus for reallocating the resources among the partitions, comprising:
    an assessment collector responsive to receiving a resource request message from a requesting partition in the group of logical partitions for sending an assessment request message to another partition in the group of logical partitions requesting that the other partition assess whether it has resources available for the requesting partition; and
    an assessment analyzer responsive to receiving an assessment response message from the other partition indicating whether it has resources available for the requesting partition for sending a message to the requesting partition informing it whether resources are available from another partition;
    wherein the requesting partition and the other partition each have a performance index associated therewith, the performance index being based on a delay-to-using ratio, and in which the resource request message and the assessment response message from these partitions each specify a current performance index of the respective partition and a projected performance index of the respective partition with the additional resources reallocated, and in which the assessment analyzer:
    determines net changes in the performance indexes of the requesting partition and the other partition resulting from reallocation of the additional resources from the other partition to the requesting partition; and
    effects a resource reallocation from the other partition to the requesting partition only if the net change in the performance index of the requesting partition is greater than the net change in the performance index of the other partition.

11. The apparatus of claim 10 in which the assessment collector sends assessment request messages to, and the assessment analyzer receives assessment response messages from, a plurality of other partitions in the group of logical partitions.

12. The apparatus of claim 11 in which the assessment analyzer is responsive to receiving a plurality of assessment response messages from responding partitions, indicating that the responding partition has resources available for the requesting partition, to select a donor partition from among the responding partitions.

13. The apparatus of claim 10 in which the assessment analyzer is responsive to receiving an assessment response message from the other partition, indicating that the other partition has resources available for the requesting partition, to send a reconfiguration request message to the other partition requesting that it reconfigure itself to make resources available to the requesting partition.

14. The apparatus of claim 13 in which the assessment analyzer is responsive to a failure to receive a reconfiguration response message from the other partition, indicating that the other partition has successfully reconfigured itself to make resources available to the requesting partition, to send a message to the requesting partition informing it that no resources are available from another partition.

15. The apparatus of claim 13 in which the assessment analyzer is responsive to receiving a reconfiguration response message from the other partition, indicating that the other partition has successfully reconfigured itself to make resources available to the requesting partition, to send a message to the requesting partition requesting that it reconfigure itself to receive the resources made available by the other partition.

16. The apparatus of claim 10 in which the assessment analyzer is responsive to a failure to receive an assessment response message, indicating that the other partition has resources available for the requesting partition, to send a message to the requesting partition informing it that no resources are available from another partition.

* * * * *